(12) United States Patent
Balandier et al.

(10) Patent No.: US 11,530,613 B2
(45) Date of Patent: Dec. 20, 2022

(54) ROTATABLE FORGED DISC FOR A BLADED ROTOR WHEEL AND A METHOD FOR MANUFACTURING THEREOF

(71) Applicant: ITP ENGINES UK LTD, Whetstone (GB)

(72) Inventors: Quentin Luc Balandier, Leicester (GB); Vinod Kakade, Sapcote (GB)

(73) Assignee: ITP ENGINES UK LTD, Whetstone (GB)

(*) Notice: Subject to any disclaimer, the term of this patent is extended or adjusted under 35 U.S.C. 154(b) by 0 days.

(21) Appl. No.: 17/215,474

(22) Filed: Mar. 29, 2021

(65) Prior Publication Data
US 2021/0301663 A1 Sep. 30, 2021

(30) Foreign Application Priority Data
Mar. 30, 2020 (EP) ..................................... 20166705

(51) Int. Cl.
*F01D 5/08* (2006.01)
(52) U.S. Cl.
CPC .......... *F01D 5/08* (2013.01); *F05D 2220/323* (2013.01); *F05D 2230/25* (2013.01);
(Continued)
(58) Field of Classification Search
CPC ........ F01D 5/08; F01D 5/3007; F01D 5/3015; F01D 25/08; F01D 25/12;
(Continued)

(56) References Cited

U.S. PATENT DOCUMENTS 2,304,259 A * 12/1942 Karrer ..................... F01D 5/284
416/95
2,648,519 A * 8/1953 Campini ................. F01D 5/146
415/115
(Continued)

FOREIGN PATENT DOCUMENTS

EP 1050663 A2 11/2000
EP 2975351 A1 1/2016
EP 3150798 A1 4/2017

OTHER PUBLICATIONS

Karunaratne, M. Modelling the coefficient of thermal expansion in Ni-based superalloys and bond coatings, [online], Feb. 2016 [retrived on May 17, 2022]. Retrieved from the Internet: <URL:https://link.springer.com/content/pdf/10.1007/s10853-015-9554-3.pdf> (Year: 2016).*

(Continued)

*Primary Examiner* — Eldon T Brockman
*Assistant Examiner* — Elton K Wong
(74) *Attorney, Agent, or Firm* — Knobbe, Martens, Olson & Bear, LLP

(57) ABSTRACT

The present invention provides a bladed rotor wheel for a gas turbine engine comprising at least a rotatable forged disc, the rotatable forged disc comprising a front surface and a back surface, at least one rim surface, and a plurality of projections located on at least a portion of at least one of the front or back surface and/or on the rim surface; wherein the projections are 3D printed features protruding outwards from the front, back and/or rim surface; the projections are arranged forming a pattern so that a heat transfer capability is created at the front, back and/or rim surface; and the ratio of the distance between projections to the forged disc external radius is lower than 0.15. Furthermore, the present invention also provides a method for manufacturing a rotatable forged disc for a bladed rotor wheel.

19 Claims, 12 Drawing Sheets

(52) U.S. Cl.
CPC ...... *F05D 2230/31* (2013.01); *F05D 2240/24* (2013.01); *F05D 2260/20* (2013.01)

(58) Field of Classification Search
CPC ........... F05D 2220/323; F05D 2230/25; F05D 2230/31; F05D 2240/24; F05D 2260/20; F05D 2260/221
See application file for complete search history.

(56) References Cited

U.S. PATENT DOCUMENTS

| | | | |
|---|---|---|---|
| 4,830,575 A | 5/1989 | Bandukwalla | |
| 5,906,096 A | 5/1999 | Siga et al. | |
| 2009/0162192 A1* | 6/2009 | McCaffrey | F01D 17/162 |
| | | | 415/160 |
| 2012/0006452 A1* | 1/2012 | Mitchell | C22C 19/05 |
| | | | 148/671 |
| 2016/0222808 A1* | 8/2016 | Hough | F01D 5/3015 |
| 2016/0370008 A1* | 12/2016 | Drake | F02C 3/04 |
| 2017/0067636 A1 | 3/2017 | Lacy et al. | |
| 2017/0369187 A1* | 12/2017 | Choi | B23P 6/00 |
| 2018/0306058 A1* | 10/2018 | Lewis | F01D 25/12 |
| 2019/0085711 A1* | 3/2019 | Gibson | F02C 3/067 |
| 2019/0169991 A1 | 6/2019 | Silet et al. | |

OTHER PUBLICATIONS

Extended European Search Report for European Patent Application No. EP20166705.2, dated Jun. 2, 2020, in 2 pages.

\* cited by examiner

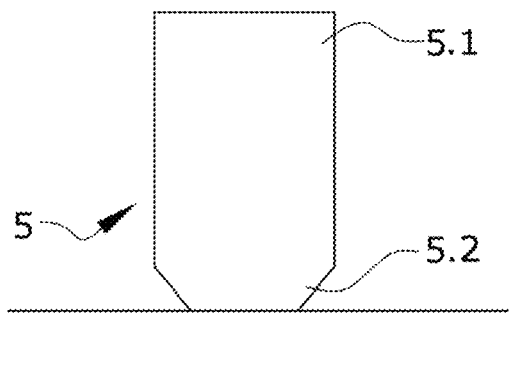
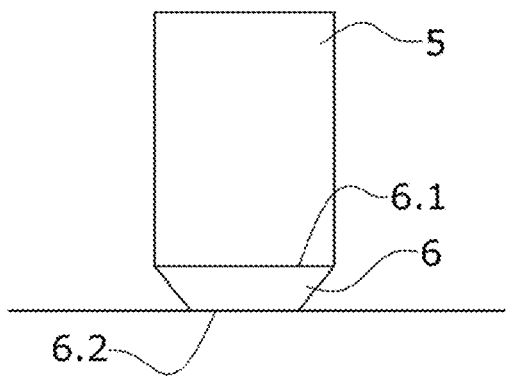
FIG.3A                FIG.3B
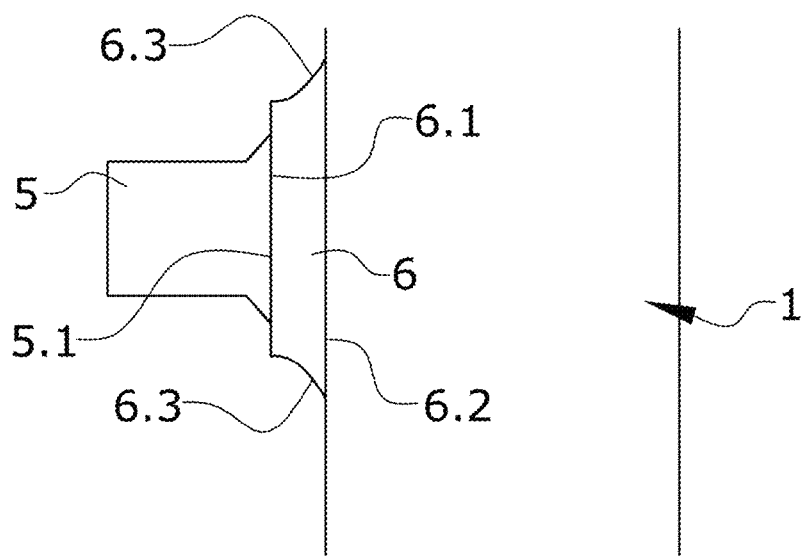
FIG.4

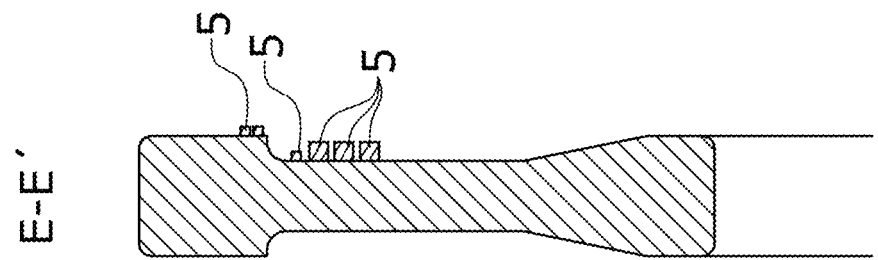
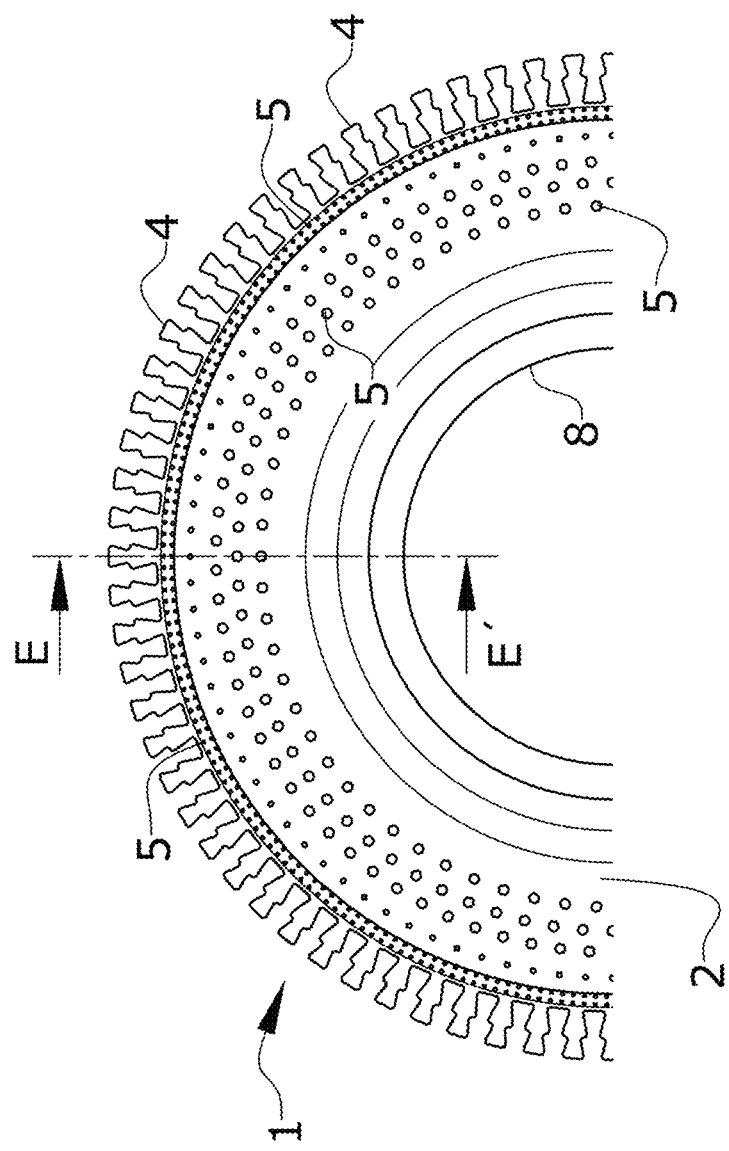
FIG.12

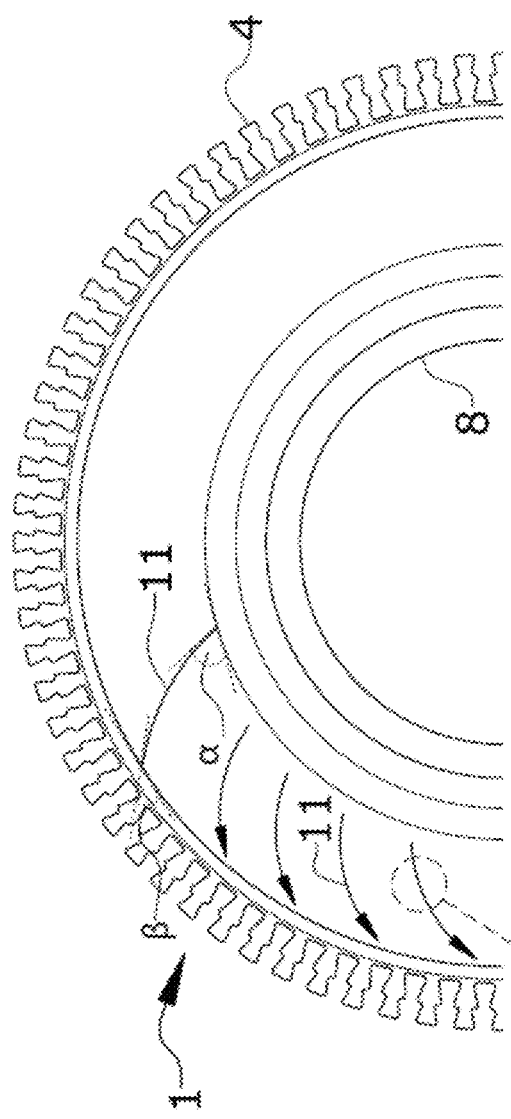
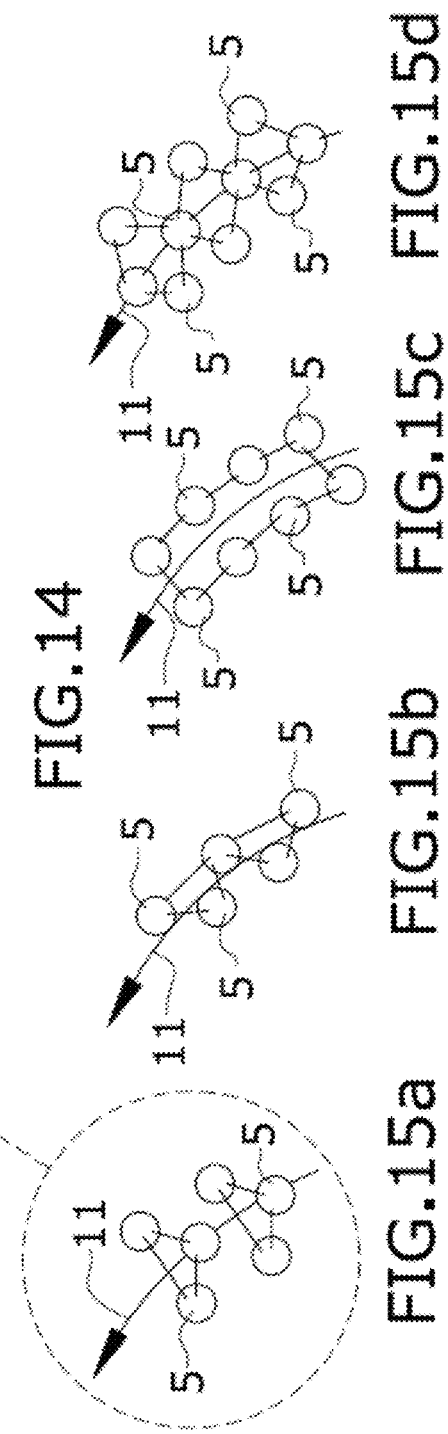
FIG. 14
FIG. 15a  FIG. 15b  FIG. 15c  FIG. 15d

ROTATABLE FORGED DISC FOR A BLADED ROTOR WHEEL AND A METHOD FOR MANUFACTURING THEREOF

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

BACKGROUND

Technical Field of the Invention

The present invention belongs to the field of gas turbine engines and relates to a bladed rotor wheel for gas turbine engines. More particularly, the present invention relates to a new forged disc arrangement for a bladed rotor wheel and aims at improving the cooling of this disc.

Specifically, the present invention provides a forged disc for a bladed rotor wheel with features that are 3D printed on the forged disc and a gas turbine engine for an aircraft comprising such discs. Furthermore, a method for manufacturing the mentioned forged disc for a bladed rotor wheel is also provided in the present disclosure.

Description of Related Art

A gas turbine engine, as it could be an aircraft turbine engine, is intended for generating mechanical power. A gas turbine engine mainly comprises an air intake system, a compressor, a combustion chamber and a turbine. Air is captured through the intake system. The compressor increases its pressure. After this, the compressed air is mixed with fuel and this mixture is burnt in the combustion chamber. The hot combustion gases are then expanded through the turbine where the gases expansion is converted into mechanical power in the form of shaft rotation. The blades and discs arrangements of the turbine carry out this conversion of gases expansion into mechanical power.

The operation of the turbine blades and discs is especially difficult since they are exposed to the high temperatures and high pressures conditions of the turbine section. Blades and discs also rotate at high speeds generating high centrifugal loads. For example, the first stage turbine of recent aero engines operates with a Turbine Entry Temperature up to 1900K (air temperature) and a shaft rotation speed up to 12500 RPM.

To mitigate the high temperatures on the turbine sections, part of the air that comes from the compressor is fed to the turbine components via a secondary air-system by-passing the primary gas path. For example, the last stage of the compressor usually feeds a secondary air system to cool the first stage turbine. The secondary air typically follows an axial path within the combustor section of the engine without being burnt. It then travels from one or several internal diameters of the combustion section internal structure and adjacent internal diameters of the disc to the outer diameters of the disc. It then reaches the turbine blades and vanes.

The turbine discs are classified as critical parts. A failure from those discs would lead to the release of high energy debris, which cannot be contained by the engine casings. Thus, due to the high strength and high life requirements combined with the high temperature capability requirements, the turbine discs are generally made from forgings of nickel based alloys and are subsequently machined.

Due to the initial forging process, requiring relatively simple tooling, and due to the requirement of maintaining the cost of machining operations post forging as low as possible, the main faces of the final machined turbine discs are essentially simple smooth and flat surfaces.

Non-destructive inspections of the forgings (e.g., such as ultrasonic or magnetoscopic inspections) with known Probability of Detection (POD) guarantee that the forgings have a very low probability of containing a material defect. A defect present in the turbine disc in a highly stressed area could lead to crack initiation, crack propagation and then disc burst during service operation. Nowadays, due to the constant improvements and monitoring of the forgings and post forging machining processes, turbine discs made from forgings of nickel based alloys have an extremely low probability of containing a material anomaly.

In addition, as increasing the Turbine Entry Temperature (TET) is beneficial for efficiency improvements, high material grades of nickel based alloy, made from complex forging processes such as Net-Shape Hot Isostatic Pressing of powder alloys, have been recently developed and are now used in production. Such complex alloys have a higher temperature capability than the previous generations of nickel based alloys.

However, these developments of materials for increasing the temperature capability of the turbine rotors have reached a plateau and are not enough for further increasing the Turbine Entry Temperature and/or reducing the cooling air consumption of the turbine. Therefore, there is a need to develop new solutions to improve the cooling on the turbine discs, without compromising their original safety and reliability characteristics.

SUMMARY OF THE INVENTION

The present invention provides a solution for the aforementioned problems, by providing a bladed rotor wheel for a gas turbine engine according to claim 1, a gas turbine engine according to claim 16 and a method for manufacturing a rotatable forged disc according to claim 17. In dependent claims, preferred embodiments of the invention are defined.

The present invention is intended to provide a new solution for the cooling of the turbine discs that is based on the arrangement of rotatable forged discs with 3D printed projections protruding outwards from the surfaces of these discs, and also based on the method for manufacturing the mentioned rotatable forged disc with 3D printed projections.

In a first inventive aspect the present invention provides a bladed rotor wheel for a gas turbine engine comprising at least a rotatable forged disc, the rotatable forged disc comprising:

a front surface and a back surface,
at least one rim surface, and
a plurality of projections located on at least a portion of at least one of the
front or back surface, and optionally on at least a portion of the rim surface, wherein
the projections are 3D printed features protruding outwards from the front and/or back surface, and optionally from the rim surface,
the projections are arranged forming a continuous pattern so that an extensive bulk heat transfer capability is created at the front, back and/or rim surface; and the ratio of the distance between projections to the forged disc external radius is lower than 0.15.

The present rotor wheel comprises at least a rotatable disc on which outer periphery a plurality of blades is mounted. Particularly, this disc is configured to rotate around a shaft of the gas turbine engine and is made of a forged metal material. In a more particular embodiment, the bladed rotor wheel comprises a plurality of rotatable forged discs according to this invention, all of these forged discs being rotatable around the same axis or shaft.

The rotatable forged disc comprises two surfaces, which are identified as front and back surfaces according to the direction that the airflow follows through the gas turbine engine, that is, from the intake to the exhaust of the engine. Particularly, the front surface of the disc corresponds to the disc surface that is faced to the intake airflow and the back surface of the disc corresponds to the opposite surface. The front and back surfaces can be composite surfaces (i.e. made from several adjacent surfaces). The front and back surfaces of the rotatable disc are essentially large and simple surfaces of revolution (i.e. a surface generated by rotating a curve about the engine axial direction) defining the rotor contour. To lower costs and maintain structural integrity, such surfaces are obtained by cost effective manufacturing processes, such as near net shape forging followed by simple CNC milling or turning machining operations, with limited material removal.

The present rotatable forged disc further comprises at least one rim surface. This rim surface is comprised in a rim portion of the disc that is formed in the outer periphery of the disc. The rim portion of the disc is defined as the disc interface, where the blades are engaged into the disc. A characterizing attribute of the rim portion is the disc external radius. The rim peripheral surface is also a simple surface of revolution (i.e. a surface generated by rotating a curve about the engine axial direction) defining the rotor peripheral contour. To lower costs and maintain structural integrity, the rim peripheral surface is also obtained by cost effective manufacturing processes, such as near net shape forging followed by simple CNC milling or turning machining operations, with limited material removal. However, the accurate positioning of the blades relatively to the disc requires the costly machining of additional slots surfaces. The slots are not a surface of revolution. The slots define distinct partial enclosures with limited access at the front of the slot and back of the slot. Generally, the slots also have a skew angle relatively to the engine axis to align the blade root and disc post with the aerofoil shape of the blade. Finally, the slots have a dovetail or firtree contour matching the blade root contour and extruded along the slot longitudinal direction. Such dovetail or firtree contour leads to a disc post wider at the rim peripheral surface than at the slot bottom face. This contour prevents access from the top of the slot to the complete slot bottom face. In an embodiment, the rim is made from a plurality of rim surfaces, obtained through complex machining operations, such as broaching.

Specifically, the present rotatable forged disc is intended to be located on the turbine section of a gas turbine engine, that is, in the section where the combusted air is expanded from the combustion chamber.

Furthermore, the rotatable forged disc comprises a plurality of projections arranged on at least a portion of the front surface and/or back surface, and optionally on at least a portion of the rim surface. These projections are understood as bodies that protrude outward from the rotatable disc surfaces. Particularly, the projections are 3D printed discrete features. That is, these protruding features can be 3D printed onto the surfaces of the disc already provided. In this sense, the projections are positive features added to the conventional rotatable disc, the disc being made from a forging, machined and then subjected to 3D printing operation. In a particular embodiment, the plurality of projections are arranged on the complete front surface, back surface and/or rim surface.

These 3D printed projections advantageously improve the overall temperature capability of the disc and the engine turbine inlet temperature (TET), thus improving the overall engine efficiency. More particularly, the projections increase both the turbulence and contact areas at the disc surface and therefore create a heat exchange function for cooling at the forged disc external surfaces, which are smooth in the state of the art arrangements. That is, the present projections create a heat exchanger transferring heat from the disc body to the secondary air cooling of the turbine engine and hence reduce the disc temperature. This secondary air cooling flow corresponds to a part of the air that comes from the compressor and is circulated towards the blades and vanes of the turbine. The projections cover a large proportion of the disc surfaces of revolution, providing a large increase of the heat transfer from the cooling air to the disc. This modifies the air system balance of the turbine stage, with much lower cooling air required for the disc and results in a significant reduction of the disc underlying bulk temperatures (i.e. temperature changes across the disc volume). In a more specific embodiment, the projections cover a portion of the front surface (and/or back surface) of the rotatable disc, having an external radius matching the rim peripheral surface radius and an internal radius comprised between the slots bottom faces radius and half of the disc external radius. Such large covering leads to a change of the air system balance and a significant temperature reduction of the disc bulk material—including a temperature reduction of all of the slot faces—by at least 20° C., significantly increasing the creep life of the disc. To provide further heat transfer capacity, the rim peripheral surface (i.e. surface of revolution at the rim) may also include projections. In other words, the arrangement is designed to provide at least 20° C. reduction for all points of the hottest part of the disc (i.e. including all high stress points such as firtree or dovetail serrations of the rim). The temperature reduction is not localized at specific points of the disc surface, it impacts the bulk material of the disc.

In addition, the use of 3D printing allows adding protruding features (projections) to the forging of the disc which would be too difficult and too expensive to obtain through standard forging and post forging machining process. That is, given that each projection has a low volume compared with the bulk of the forged disc, it would very difficult and costly to manufacture these projections using standard manufacturing tools post forging process. For example, the tool vibration could break the projections or the tool cutter would not allow the projections to be as close to each other as required for cooling purposes. Finally, the time required to manufacture all projections through standard machining process would lead to prohibitive costs.

The above advantages are achieved thanks to the arrangements of the plurality of projections in a continuous pattern on any mentioned surface of the rotatable forged disc. That is, the projections are positioned maintaining a predetermined relationship between them and forming a predetermined pattern. A "continuous pattern" will be understood as a pattern covering a disc surface of revolution without interruption or discontinuity of the pattern following the disc circumferential direction. In the case of the surface of revolution entailing additional complex distinct machined surfaces such as the rim slots, the main rim surface of revolution still has a pattern, with continuity provided by the pattern in the front face and/or back faces of the rotatable disc.

Due to the disc rotation, the air system balance is a function of the flow swirl. For this reason, continuity of the pattern in the circumferential direction is maintained in the front and/or rear faces of the disc to prevent flow breakdowns.

Furthermore, by definition of the front, back and rim surfaces, the features arranged on the front and/or back surfaces are patterned in a radial and circumferential direction; and the features arranged on the rim surface are patterned in an axial and circumferential direction.

Preferably, the predetermined pattern of projections is such that a network of open flow paths is created. This network creates a high number of surfaces through which the pressurized cooling air passes.

Particularly the ratio of the distance between the projections to the forged disc external radius is lower than 0.15. Advantageously, this ratio configuration creates a pattern of projections dense enough to increase the local turbulence and/or the heat transfer for cooling purposes. First, turbulence is beneficial for heat transfer. The projections can modify the turbulence in the boundary layer of the flow close to the disc surface. The projections can also modify the overall turbulence in the stator-rotor cavity under consideration. Second, the heat transfer capability is a function of the contact area between the cooling air and the hot surfaces of the disc. Therefore, increasing the pattern density (i.e. number of projections per unit surface of the disc) and/or increasing the size of the projections increases the available contact area for heat transfer purposes.

Given the present solution, as the bulk of the disc is still made from a forging, its strength and other attributes such as fatigue or creep capability are not compromised. Especially, the main loaded parts of the turbine disc such as its bore and its diaphragm still have the same material properties as in an arrangement without protrusions.

In addition, the defect rate in the bulk of the disc made from a forging is still very low. Conversely, the 3D printing process of high strength super-alloys may produce defects or anomalies in the current state of the art of the process. As the 3D printed projections are protruding outwards from the surfaces of the disc, they will not develop significant internal stresses due to the transfer of centrifugal loads from the blades to the disc bore. The protrusions are outside the main load paths during service operation. This configuration reduces the probability of a material defect potentially present in the projections to propagate under loading conditions. Furthermore, as the projections are protruding from the disc surfaces, this creates a discontinuity between the disc forging external surface and the projections, leading a crack potentially developing in the projection to break off the interface between the projection and the disc without propagating into the disc bulk itself, preventing its burst during service operation. Release of a projection will have no hazardous effect to the gas turbine.

Furthermore, the defect rate in the 3D printed projection depends on the volume of printed material, the type of the printed material, the printing parameters and the heat treatment processes. As the 3D printed projections have no load carrying purposes, the material chosen can have an ultimate or proof strength significantly lower than the ultimate or proof strength of the forged disc. For instance, the printing of a softer material will reduce the likelihood of defect formation during the printing process.

Additionally, as strength is not the primary attribute targeted for the material used in the projections, the composition of the material used to print the projections, preferably a nickel based alloy, can be re-balanced to optimize attributes such as corrosion resistance or oxidation resistance. For example, the chrome content in the projection material could be higher than the chrome content in the disc material to improve corrosion resistance at the expense of strength.

In a particular embodiment, the projections are 3D printed with a printed nickel based superalloy that has a different proof strength and/or corrosion resistance and/or oxidation resistance than the disc forging itself.

In a particular embodiment, the bladed rotor wheel further comprises a high temperature resistant coating applied on the rotatable forged disc so that this coating covers at least part of any of the disc surfaces and the projections. In this configuration, the projections are also used to support the adhesion of the coating, to protect the disc surface to the exposure to high temperatures. In a preferred embodiment, the coating is arranged covering the surfaces of the disc exposed to the highest temperatures, especially in the rim area. As the protrusions are subjected to low stress levels during the disc operation, the coating is also subjected to low operating stress levels. This significantly increases the coating life, which is a function of both metal temperature and stress levels. Furthermore, as the protrusions are close to each other, and as the protrusions create surfaces extending from the disc main faces, the failure mode of the coating is improved. In case of coating cracking or spallation, the release of large coating material is unlikely. In this case, small elements of coating are released, leading to localized hot spots only and preventing a significant increase of the disc temperature.

In a particular embodiment, the rotatable forged disc further comprises:
  at least a forged cover plate with an inside and outside face, and
  a plurality of projections located on at least one of the inside or outside face of the cover plate.

The cover plate gives some protection to reduce the disc exposure to hot gases. Particularly, the cover plate can protect the disc rim.

The cover plate is designed to remain rotationally stationary relative to the rotatable forged disc and is arranged at an axial end of this rotatable forged disc of the turbine rotor. Particularly, the cover plate extends from one of the forged disc surfaces or interfaces such as a bolted joint, so that one of the surfaces of the cover plate is substantially faced to the front or back surface of the forged disc and is identified as the inside face whilst the other surface of the cover plate is identified as the outside face. As described with the disc, the cover plate is also classified as a critical part. Due to the high strength and cleanliness (i.e. low probability of having a material defect) requirements of the cover plate, the cover plate is preferably made from a forged nickel based alloy, subsequently machined.

Specifically, an embodiment of the present invention also provides projections on any of the faces of the cover plate. This embodiment is provided to further improve the cooling of the rotatable forged disc inside the gas turbine engine.

In a particular embodiment, the projections comprise:
  a cylinder shape, or
  a prism shape, or
  a droplet shape, or walls, or 3D cells, or any combination of the above.

The 3D cell is understood as a complex 3D shape made from a number of surfaces and preferably significantly higher than in the other shapes (cylinder, prism, droplet or wall).

Advantageously, the particular embodiment wherein the projections are arranged forming 3D cells significantly increases the surface contact area, and therefore, the heat transfer and cooling are advantageously increased.

The shape of the projection can be designed to control or modify the turbulence in the boundary layer of the flow. In a particular embodiment, the base of the projection can have a droplet shape, whereas the other sections of the projection can have a different shape, such as a cylinder.

In a particular embodiment, the height of the projection is small (<10%) relatively to the width of the stator-rotor cavity, thus preventing a large modification of the cavity flows.

In a particular embodiment, the size of the projections and/or density of the projections pattern varies between them. In other words, the size of the projections and/or density of the projections pattern is not constant throughout the surface on which the projections are arranged.

In an embodiment, the size of the projections and/or the density of the projections pattern varies according to the expected surface temperature distribution on the forged disc. That is, any or both of the size of the projections and the density of the projections pattern is different in each part of the disc.

For example, the radial and/or circumferential density of the projections pattern can follow a predetermined law linked to the disc temperature gradient. In an embodiment, the size of the projections and/or density of the projections pattern increases in a radial direction of the rotatable forged disc. This is advantageous because the outer diameter of the disc is generally much hotter than the inner diameter of the disc.

Advantageously, this optimized configuration of the size and/or density of the projections pattern compensates or reduces the thermal gradients across the forged disc, reducing the disc thermal stresses.

The characteristics of the projections pattern can also be optimized to improve the behavior between the cooling air and the rotating disc, which creates a swirl component to the cooling airflow. The path of the cooling airflow from inner diameter to outer diameter of the disc depends on the tangential, radial and resulting velocities at the inner and outer diameters of the disc. Thus, based on targeted velocities, the pattern may be designed to maximize the cooling effect. The aim of the optimization would be to improve the cooling, and also to prevent airflow disturbances, airflow breakdown and control of pressures losses. In an embodiment, the projections are arranged following a predicted theoretical (i.e. ideal) stream line direction on the disc surface, easing the path of the cooling flow.

In a particular embodiment, the orientation of the projections relative to the airflow direction can take the following forms: triangular, rotated triangular, square, and rotated square. These patterns can be adapted as a function of the swirl component created by the rotating disc and hence to improve the heat exchange created on a rotating surface.

In a particular embodiment, the projections are arranged forming a triangular pattern every three projections or a square pattern every four projections. The triangular pattern is understood as a triangular sequence in which each vertex of a triangle corresponds to the center of a projection. The square pattern is understood as a square sequence in which each vertex of a square corresponds to the center of a projection.

In a more particular embodiment, the projections are arranged according to a portion of curve matching a theoretical stream line direction defined by predicted radial, tangential and resulting airflow velocities at the inner and outer diameters of the rotatable forged disc during operation; wherein according to this theoretical stream line direction:

for each triangle of the triangular pattern, one side of the triangle is perpendicular to the theoretical stream line direction at the position of the triangle, or for each triangle of the triangular pattern, one side of the triangle is parallel to the theoretical stream line direction at the positon of the triangle, or for each square of the square pattern, two sides of the square are perpendicular to the theoretical stream line direction at the position of the square, or for each square of the square pattern, a diagonal of the square is parallel to the theoretical stream line direction at the position of the square, wherein the theoretical stream line direction is defined:

at the disc inner diameter, by an inlet angle between a tangent to the theoretical stream line direction and the disc tangential direction, wherein $\alpha \neq 90°$;

at the disc outer diameter, by an outlet angle between a tangent to the theoretical stream line direction and the disc tangential direction, wherein $\beta \neq 90°$; and a joining curve whose points necessarily have an angular position increasing with radial position due to the non-zero components of the airflow radial and tangential velocities.

Preferably, the inlet angle and the outlet angle are set to optimize the flow velocities (tangential, radial and resulting velocity) at the internal and external diameter of the disc for a given speed band.

More specifically, in the first step of the design of a turbine stage air system, the performance and cooling requirements define the pressures, mass flows, and rotational speed of the stage. This further defines the resulting, tangential and radial velocities of the flow at the internal and external diameters of the disc without the protrusions. From the respective norm of the resulting, tangential and radial velocities, the angles of a theoretical stream line relatively to the discs radial and tangential directions are defined. In the second step of the air system design, the definition of the protrusions design will change the heat transfer coefficients and pressures losses in the air-system model. The pattern can be adapted to the theoretical stream line from the first step to optimize heat transfer and pressure losses coefficients. In a third step, the air system of the considered turbine stage can be re-evaluated taking into account the characteristics of the pattern.

According to the triangle patterns, a group of projections is arranged forming a triangular sequence in which one side of each triangle is perpendicular to the theoretical stream line direction. Alternatively, a group of projections may be arranged forming also a triangular sequence but in which one side of each triangle is parallel to the theoretical stream line direction.

On the other side, according to the square patterns, a group of projections is arranged forming a square sequence in which two sides of the square are parallel to the theoretical stream line direction and the other two sides of the square are perpendicular to said theoretical stream line direction. Alternatively, a group of projections can be arranged forming a square sequence in which the diagonal of the square is parallel to said theoretical stream line direction.

Advantageously, the pressure and resistance losses (i.e. windage) are reduced given that the arrangement of the projections is optimized according to the above patterns through which the velocities and pressures losses of the airflow are optimized.

In a particular embodiment, the first row(s) of the pattern (i.e. the row(s) closer to the disc inner diameter) comprises different features or different projection shape or size or orientation to guide the airflow through the pattern.

In a particular embodiment, the last row(s) of the pattern (i.e. the row(s) closer to the disc outer diameter) comprises different features or different projection shape or size or orientation to guide the airflow through adjacent interfaces and components. In a more particular embodiment, the last row(s) of the pattern are oriented to prevent the risk of hot gas ingestion from the main gas path into the stator-rotor cavity.

In a particular embodiment, the features or projections located closer to the disc inner diameter are different to the features or projections located closer to the disc outer diameter.

In a particular embodiment, the projections comprise at least one cavity. This cavity reduces the amount of printed material, reduces costs and also makes the interface between the projections and the forged disc easier to break, further prevents a potential crack to reach the bulk of the disc forging.

In a particular embodiment, the base of the projection is smaller than the body section of the projections. By making the base of the projection smaller than its body, the projection is weaker at its base. This will further increase the probability of a crack starting from the projection to break-off the feature rather than reaching the bulk of the disc forging.

In a particular embodiment, the material strength of the projections is different than the material strength of the rotatable forged disc. In particular, the ratio of proof strengths of the disc and projections material is greater than 20%. Advantageously, the printing of a softer material will reduce the defect rate in the projections. Furthermore, in an embodiment the oxidation or corrosion resistance of the projections is different than the oxidation or corrosion resistance of the rotatable forged disc. In particular, the ratio of oxidation or corrosion resistance of the projections and disc material is greater than 20%.

In a particular embodiment, the projections are printed to the rotatable forged disc on an intermediate support surface. The intermediate support surface can be either machined as part of the machining operations post forging or 3D printed.

As a result, projections with intermediate support surfaces between the projection and the surface of the forged disc are provided. The intermediate support surface is understood as a delimited interface between the bulk of the disc and the 3D printed projections. Particularly, the intermediate support can be directly machined on the forged disc. Alternatively, the intermediate support surface can be 3D printed on the forged disc, with or without final machining with metal cutting operation.

This configuration provides a distinct surface that can be machined and/or prepared with specific surface parameters (such as with a greater or lower roughness and/or hardness and/or flatness tolerances than the disc body). For further example, the intermediate support surface can have different shot peening parameters requirements than the rest of the surfaces of the disc. Therefore, these machined or printed intermediate support surfaces can facilitate the printing process of the individual projections and also facilitate the projections to be removed and/or machined off and/or repaired from the disc surface.

In a more particular embodiment, the intermediate support surface protrudes from the front surface and/or from the back surface, and optionally from the rim surface of the rotatable forged disc. As with the mechanism described for the protrusions, this creates very low stress levels in the intermediate support surface.

In a more particular embodiment, the intermediate support surface is used as a mean to further reduce the stresses in a coating applied to the disc.

In a more particular embodiment, the protruding intermediate support surface is printed onto the disc and is made of a material having a coefficient of thermal expansion different than the coefficient of thermal expansion of the disc. The coefficient of thermal expansion of the printed material is chosen with an intermediate value between the coefficient of thermal expansion of the coating and the coefficient of thermal expansion of the forged disc. As the coating is usually applied at very high temperature using thermal spray, the coating can develop residual stress during its application. Residual stress adds up to the operating stress and then limits the coating life during operation. The coefficient of thermal expansion of the coating and of the base material dictate the differential expansion of the coating and base material during coating application.

Thus, it dictates the level of residual stress in the coating. The use of an intermediate coefficient of thermal expansion value in the intermediate surface will reduce the residual stress in the coating, hence increasing the coating life during operation.

In another particular embodiment, the intermediate support surface is at least a recess on the rotatable forged disc or on a printed support. It is understood that in these embodiments the intermediate support surface is a recess in the surface of the forged disc or is a recess in the surface of a support printed onto the forged disc so that the projection is located partially inside the recess and protrudes from the inside of said recess.

In a particular embodiment, the bladed rotor wheel further comprises a high temperature resistant coating applied on the rotatable forged disc so that this coating covers at least the intermediate support surface.

In a more particular embodiment, at least a portion of the intermediate support surface forms an angle of 45° with respect to a surface of the rotatable forged disc. Advantageously, this configuration increases the contact area at the interface between the forged disc and the projection and thus it makes the printing of the projections easier.

In a particular embodiment, at least one portion of the surface of the rotatable forged disc where the projection is located has a roughness and/or flatness tolerance and/or hardness different from the rest of the rotatable forged disc.

In a second inventive aspect, the present invention provides a gas turbine engine comprising a bladed rotor wheel according to the first inventive aspect.

In another inventive aspect, the present invention provides an aircraft comprising a gas turbine engine according to the second inventive aspect.

In a third inventive aspect, the present invention provides a method for manufacturing a rotatable forged disc for a bladed rotor wheel according to the first inventive aspect, the method comprising:

a) providing a rotatable forged disc that comprises a front surface, a back surface and a rim surface, and b) 3D printing projections on at least a portion of at least one of the front and/or back surface, and optionally on at least a portion of the rim surface.

That is, the method according to the present invention is intended to modify the actual gas turbine engines in order to increase the cooling in the turbine section by means of 3D printing a plurality of projections on the surfaces of the rotatable forged disc of a bladed rotor wheel.

All the features described in this specification (including the claims, description and drawings) and/or all the steps of the described method can be combined in any combination, with the exception of combinations of such mutually exclusive features and/or steps.

BRIEF DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

FIGS. 3A-3B These figures shows a schematic cross sectional view of a 3D printed projection on a rotatable forged disc according to embodiments of the present invention.

FIG. 4 This figure shows a schematic cross sectional view of a 3D printed projection on a rotatable forged disc according to an embodiment of the present invention.

FIG. 12 This figure shows a schematic view of a rotatable forged disc according to an embodiment of the present invention and a cross sectional view E-E' of this rotatable forged disc.

FIG. 14 This figure shows a schematic view of a rotatable forged disc according to an embodiment of the present invention.

FIGS. 15*a-d* These figures show schematic views of a detail of FIG. 14 according to projections pattern embodiments of the present invention.

DETAILED DESCRIPTION OF THE INVENTION

Figure 1:
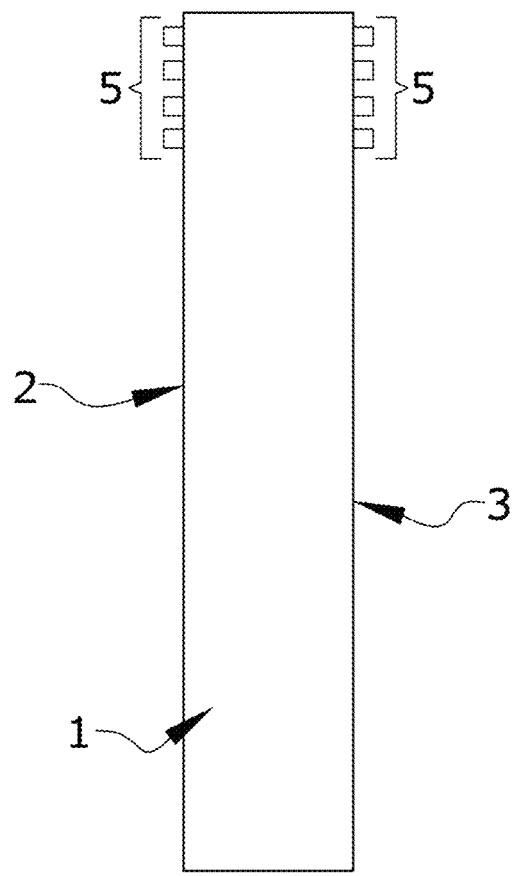
FIG. 1 This figure shows a schematic cross sectional view of a rotatable forged disc according to an embodiment of the present invention.

FIG. 1 shows a schematic cross sectional view of a rotatable forged disc (1) for a bladed rotor wheel of a gas turbine engine (not shown), particularly, for a turbine section. The rotatable forged disc (1) comprises a front surface (2) and a back surface (3). The front surface (2) is the one intended to be faced to the intake airflow coming from the combustion section of the gas turbine engine, as well as faced to the airflow coming from the compression section for cooling the turbine section. The back surface (3) corresponds to the opposite face of the front surface. The rotatable forged disc (1) further comprises at least one rim surface (4) shown in FIGS. 8-12.

In addition, the rotatable forged disc (1) comprises a plurality of 3D printed projections (5) that can be located on at least a portion of the front surface (2) or the back surface (3), and optionally on at least a portion of the rim surface (4). Particularly, in FIG. 1, the rotatable forged disc (1) comprises a plurality of projections that are 3D printed on both the front (2) and back (3) surfaces.

These projections (5) protrude outwards from the front (2) and back (3) surfaces of the forged disc (1). Particularly, the projections (5) form a pattern along the surfaces (2, 3). The projections (5) are arranged with a predetermined distance between them according to a predetermined pattern. The pattern configuration increases the heat transfer in those surfaces of the forged disc (1), and therefore, the cooling on the forged disc (1) in the turbine section of a gas turbine section is improved. That is, the pattern arrangements of the projections create a network of flow paths which allow the airflow coming from the compressor section to flow through this pattern, thus cooling the disc surfaces. Specifically, these projections located on the surfaces of the forged disc (1) increase the disc cooling compared with the prior art solution. This is because the contact surface and turbulence between the disc and the cooling airflow increase.

More particularly, to have a pattern of projections dense enough for cooling purposes the ratio of the distance between the projections (5) to the forged disc external radius is lower than 0.15.

As it can be observed on FIG. 1, each projection (5) has a volume that is relatively small compared to the bulk of the rotatable forged disc (1). Given this volume difference between the projections (5) and the disc (1), it is very difficult and costly to manufacture the projections (5) using standard machining tools. Therefore, in order to solve this drawback, the present invention provides 3D printed projections (5) on the surfaces of the disc (1). With the 3D printing provision, a plurality of projections (5) can be arranged on the surfaces of the disc (1), thus improving the overall performance of the disc and the turbine.

Moreover, in a particular example the projections (5) are made of a nickel-based superalloy to resist the high temperatures within the turbine section.

Figures 2A, 2B:
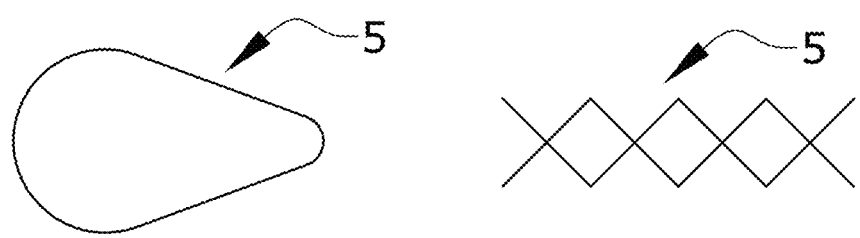
FIGS. 2A-2B These figures show an schematic upper view of 3D printed projections according to embodiments of the present invention.

FIGS. 2A-2B show two different projections shapes. In particular, FIG. 2A shows a projection (5) with a droplet shape. Advantageously, the droplet shape reduces the potential windage or resistance effect created by the protrusions. On the other hand, FIG. 2B shows a projection (5) including a plurality of cells. This multiple cells configuration advantageously provides more contact area than protrusions with other forms.

FIGS. 3-6 show a schematic cross sectional view of a projection (5) that is 3D printed on a surface of a rotatable forged disc (1) according to embodiments of the invention.

Particularly, on FIG. 3A a projection (5) is printed having a base (5.2) weaker than the body (5.1) of the projection (5). Should a crack start from the projection (5), the discontinuity at the interface between the projection (5) and the disc surface, will facilitate the projection to break off.

In FIG. 3B the projection (5) is printed on an intermediate support surface (6) that forms a base weaker than the projection (5). This intermediate support surface (6) is understood as an interface between the projection (5) and the disc surface. Should a crack start from the projection (5), the discontinuity at the interface between the projection (5) and the disc surface, will facilitate the projection to break off.

Figure 5:
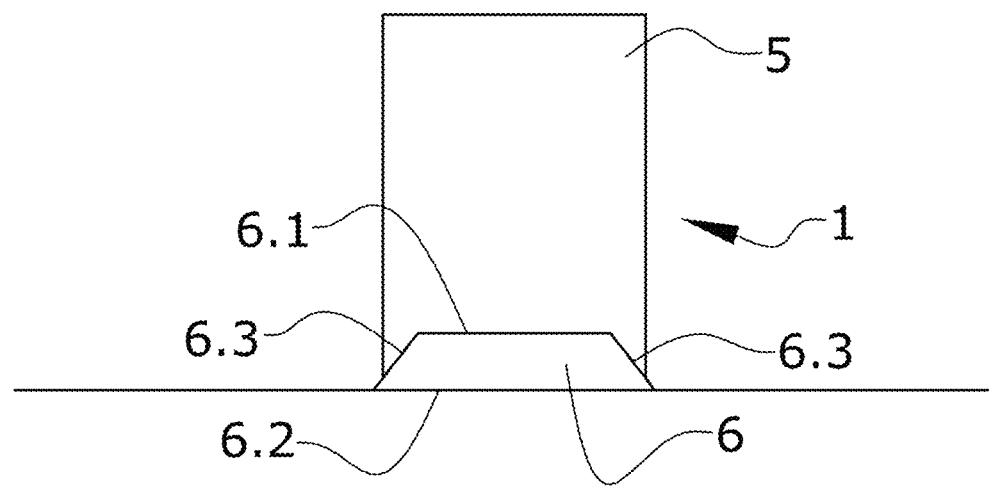
FIG. 5 This figure shows a schematic cross sectional view of a 3D printed projection on a rotatable forged disc according to an embodiment of the present invention.
Figure 6:
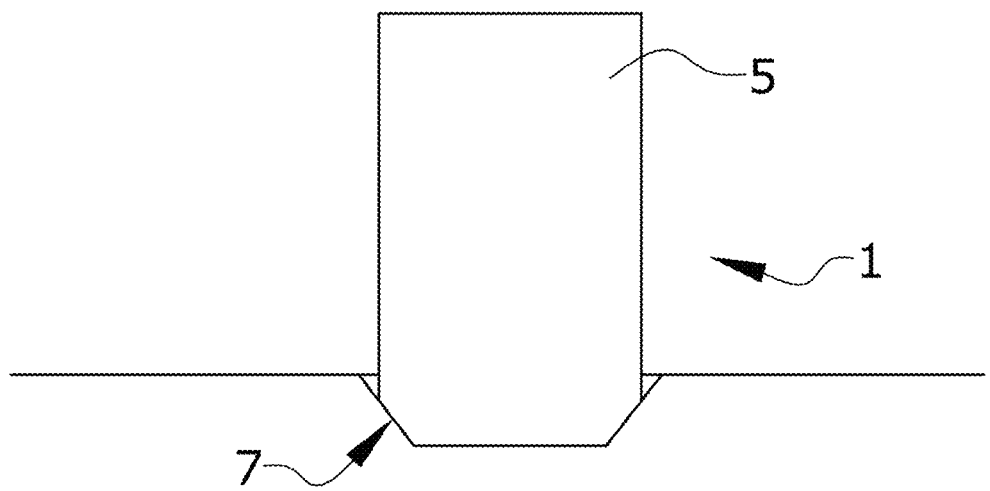
FIG. 6 This figure shows a schematic cross sectional view of a 3D printed projection on a rotatable forged disc according to an embodiment of the present invention.

As in FIG. 3B, in the embodiments shown in FIGS. 4-6 the projections (5) are 3D printed on a surface of the rotatable forged disc (1) by means of an intermediate support surface (6).

On FIGS. 3B-5, the intermediate support surface (6) is embodied as a support having a trapezoidal cross-section which is located between the projection (5) and the surface of the rotatable forged disc (1). The support (6) comprises a first side surface (6.1) which the projection (5) is printed on, a second side surface (6.2) common with the disc surface (1.1) and at least one wall (6.3).

Particularly, on FIG. 3B the projection (5) is printed along the complete surface of the first side surface (6.1) of the support (6). In this support surface (6) the area of the first side surface (6.1) is greater than the area of the second side surface (6.2). That is, the joining surface between the projection (5) and the support (6) is greater than the joining surface between the support (6) and the forged disc (1).

On FIGS. 3-5, the intermediate support surface (6) protrudes from the front (2) and/or back (3) and/or rim (4) surface of the rotatable disc (1).

On FIG. 4, the intermediate support surface (6) has been machined as part of the machining operations post forging. The projections are then printed onto this intermediate support surface (6). In this FIG. 4, the projection (5) is printed on a portion of the first side surface (6.1) of the support (6). Particularly, in this support (6) the area of the second side surface (6.2) is greater than the area of the first side surface (6.1). That is, the joining surface between the projection (5) and the support surface (6) is smaller than the joining surface between this support surface (6) and the forged disc (1). In addition, the projection (5) comprises a base (5.1) with the aim of covering more surface of the first side surface (6.1) of the trapezoidal support (6). Further, the wall (6.3) of this trapezoidal support (6) has a curvature.

The embodiment shown in FIG. 4 limits the extent of the first side surface (6.1) relatively to the original surface (3, 2, 4) of the disc (1). The isolated first side surface (6.1) can then have different machining tolerances or surface preparation requirements than the rest of the disc surfaces.

In a particular example, the intermediate support surface (6.1) receives a specific machining operation and/or preparation modifying the geometrical or mechanical characteristics of the disc surface such as roughness, flatness tolerances or hardness.

As the extent of the intermediate support surface (6) is lower than the extent of the disc surface (2, 3, 4), the intermediate support surface (6) can receive specific machining operations with tighter requirements (for example, lower roughness tolerances) than the other surfaces of the disc. This will limit the cost of the operations with tighter requirements. The projections (5) are then printed onto this support surface (6).

On FIG. 5, in the support surface (6) the area of the second side surface (6.2) is greater than the area of the first side surface (6.1). In particular, the support surface (6) may be printed onto the disc body. To reduce the probability of having a defect, a support surface (6) with a small thickness relatively to the disc width is provided.

Particularly, in this embodiment shown in FIG. 5 the projection (5) is printed on the first side surface (6.1) and on the lateral surface (6.3) of this trapezoidal support surface (6).

In the embodiment shown in FIG. 6, the projection (5) is printed on a recess (7) on a surface of the forged disc (1). The projection (5) is partially arranged inside the forged disc (1), that is, the projection is partially housed in the recess (7). In a particular embodiment, the recess (7) may be machined into the forged disc (1) body.

A portion of the intermediate support surface (6) shown in FIGS. 3B-5 forms an angle of 45° with respect to the surface of the rotatable forged disc (1).

Figure 8:
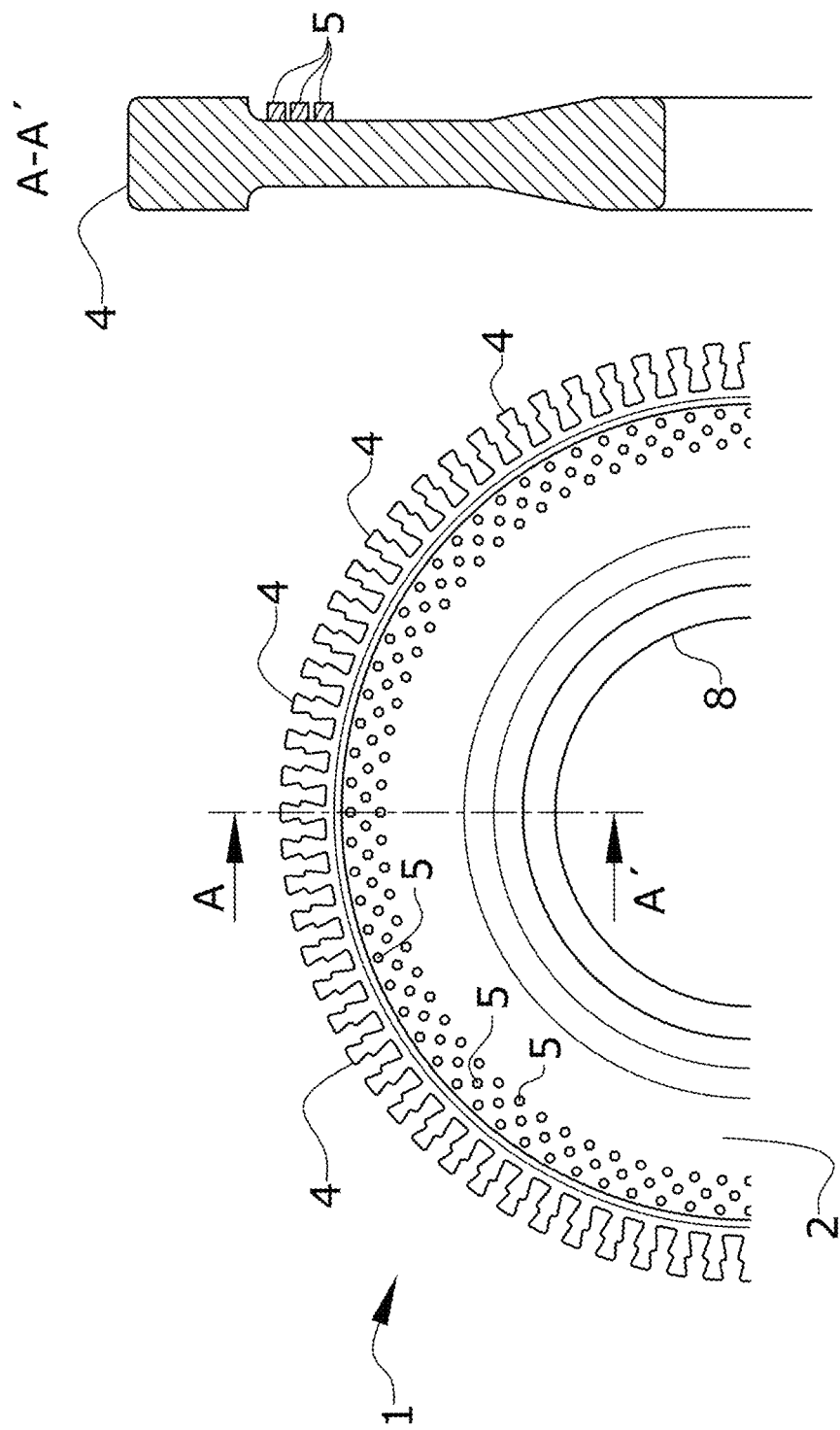
FIG. 8 This figure shows a schematic view of a rotatable forged disc according to an embodiment of the present invention and a cross sectional view A-A' of this rotatable forged disc.
Figure 9:
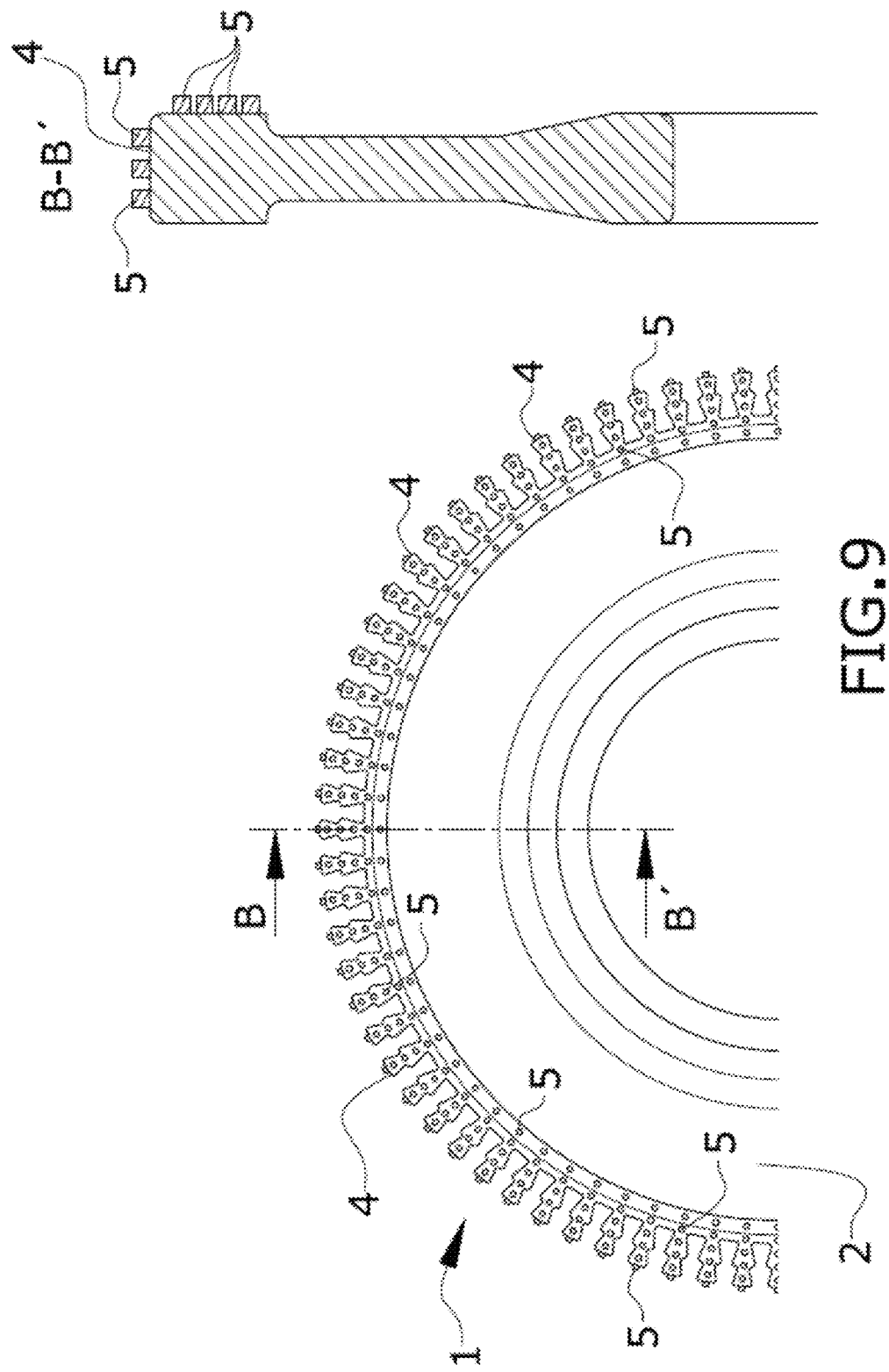
FIG. 9 This figure shows a schematic view of a rotatable forged disc according to an embodiment of the present invention and a cross sectional view B-B' of this rotatable forged disc.
Figure 10:
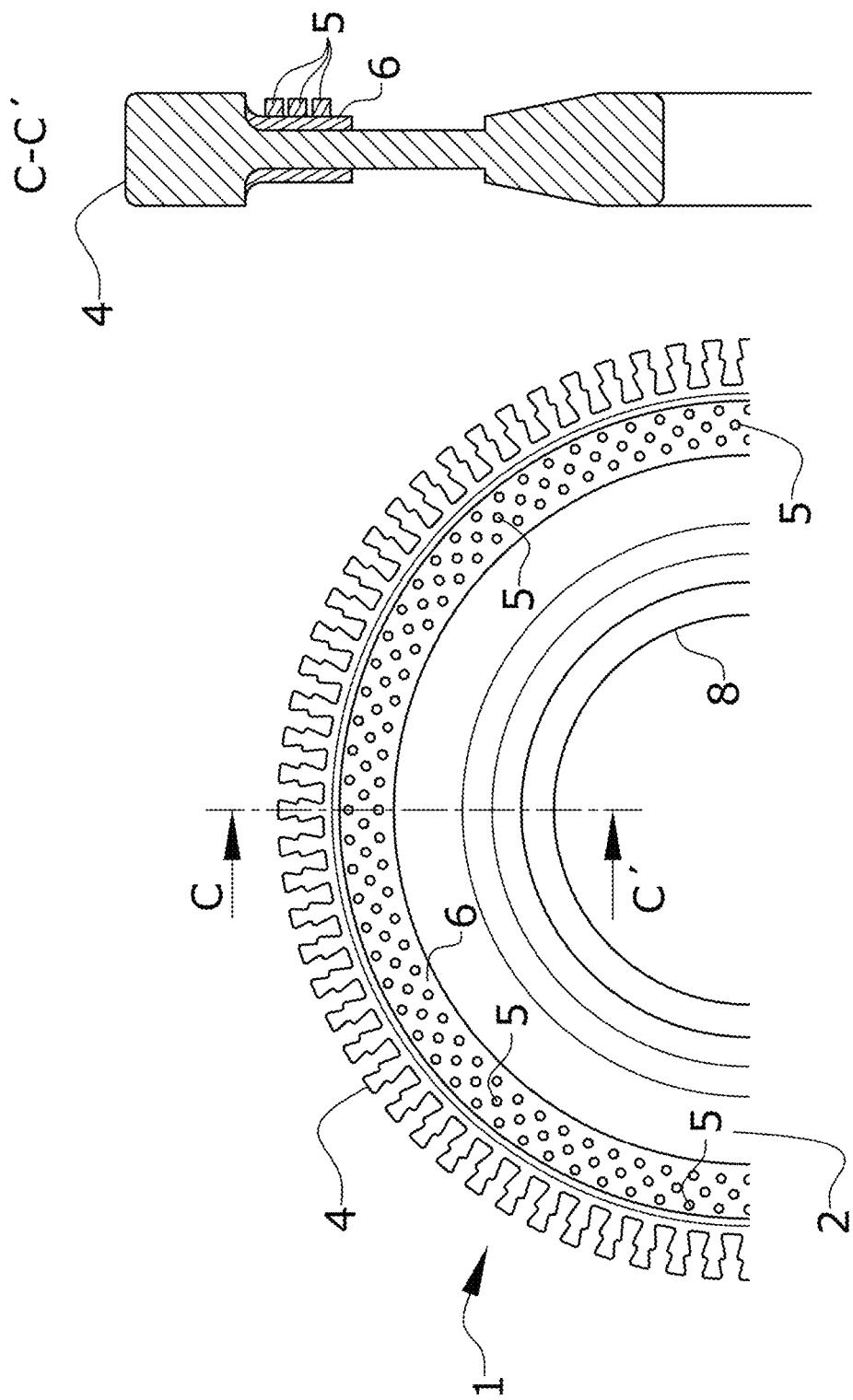
FIG. 10 This figure shows a schematic view of a rotatable forged disc according to an embodiment of the present invention and a cross sectional view C-C' of this rotatable forged disc.

FIGS. 8-10 show a portion of a rotatable forged disc (1) comprising a front surface (2), rim surfaces (4) and a disc bore (8). Particularly, FIG. 8 shows a plurality of projections (5) located on a portion of the front surface (2) of this forged disc (1). The arrangement of these projections (5) is shown in detail in the cross sectional view A-A' of the forged disc of this FIG. 8. On the other side, FIG. 9 shows a plurality of projections (5) located on a portion of the rim surfaces (4) of the rotatable forged disc (1). In particular, these projections (5) are shown in detail in the cross sectional view B-B' further shown in this FIG. 9.

FIG. 10 shows a plurality of projections (5) located on a portion of a front surface (2) of a rotatable forged disc (1). Particularly, the plurality of projections (5) are printed to the disc surface by means of an intermediate support surface (6). In this particular example, the intermediate support surface (6) is a common surface for all the projections (5). The arrangement of the projections (5) printed on an intermediate support surface (6) is shown in detail in the cross sectional view C-C' of the forged disc (1) further shown in this FIG. 10.

Figure 11:
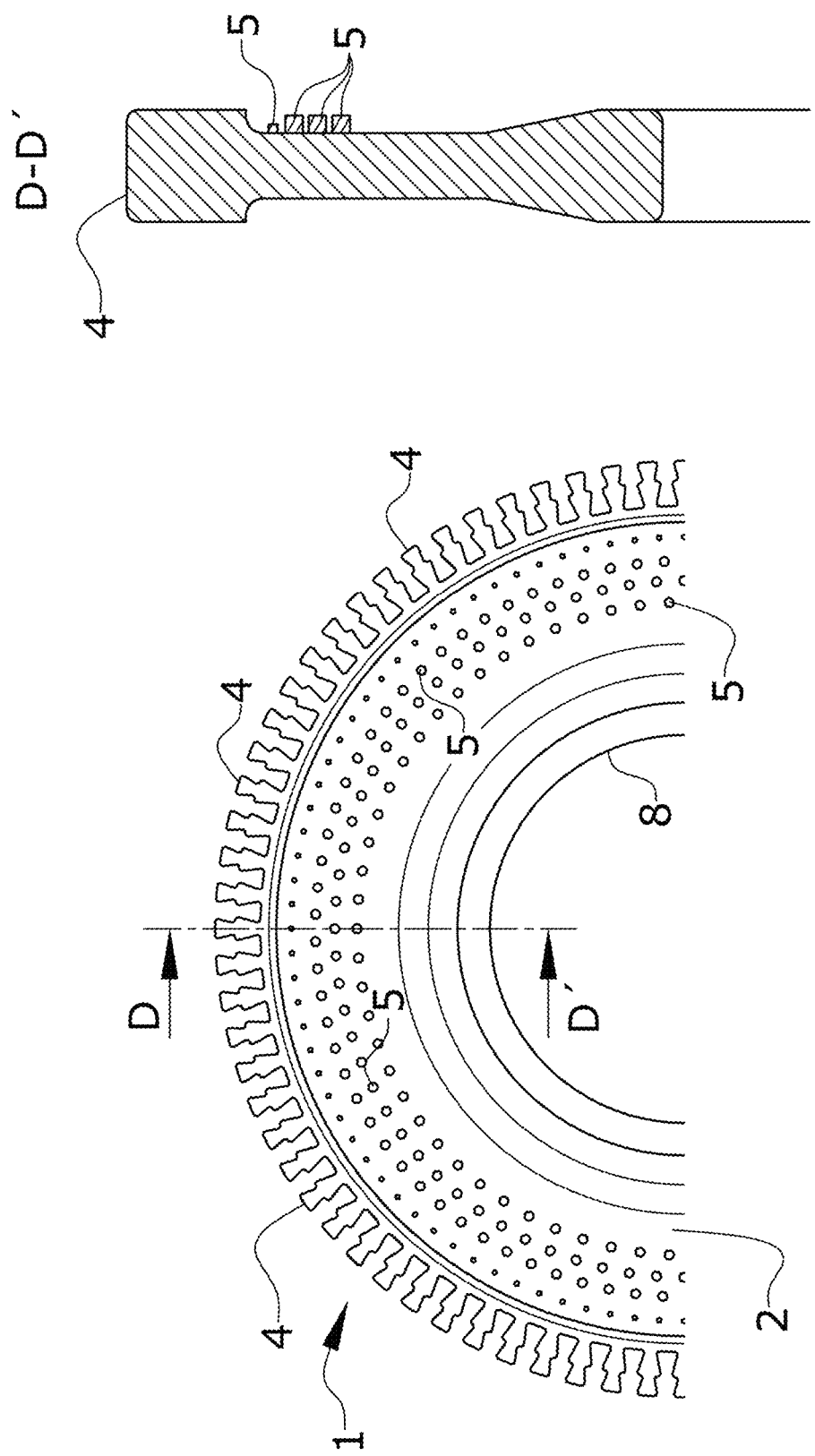
FIG. 11 This figure shows a schematic view of a rotatable forged disc according to an embodiment of the present invention and a cross sectional view D-D' of this rotatable forged disc.

In a particular example, the size and/or density of the projections pattern varies between them along the pattern they form. In a more particular example, the size of the projections (5) and/or density of the projections pattern changes in a radial direction of the rotatable forged disc (1). This particular example is shown on FIGS. 11 and 12. Particularly, FIG. 11 shows a plurality of projections (5) located on a portion of the front surface (2) of a rotatable forged disc. In this example, smaller projections are used in the front surface (2) at proximity of the rim surfaces (4) blending radius. The variation of projection size is shown in detail in the cross sectional view D-D' of the forged disc of this FIG. 11.

In addition, FIG. 12 shows a plurality of projections (5) located both on the front surface (2) and a rim surface (4) of the rotatable forged disc (1). In this example, projections are added to the rim surfaces (4) close to the blade dovetail slots to improve cooling of the disc rim. The density of the projections (5) located on the rim surface (4) is higher than the density of the last row of projections located on the front face (2) external diameter. Particularly, the variation of projection size is shown in detail in the cross sectional view E-E' further shown in this FIG. 12.

Figure 13A:
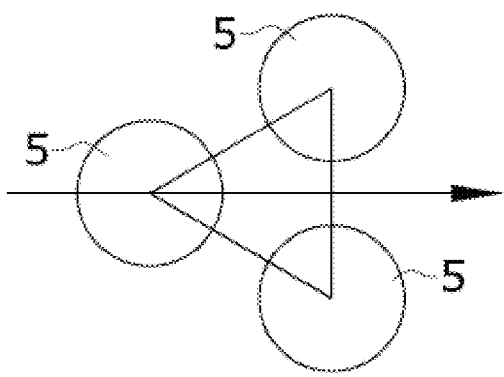
FIG. 13*a-d* These figures show a schematic view of projections patterns according to embodiments of the present invention.
Figure 13B:
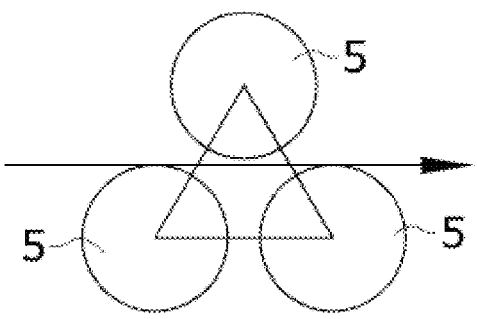
Figure 13C:
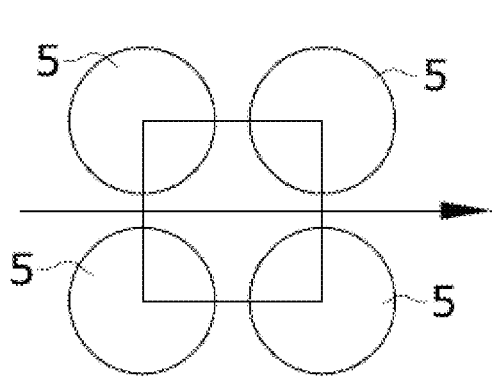
Figure 13D:
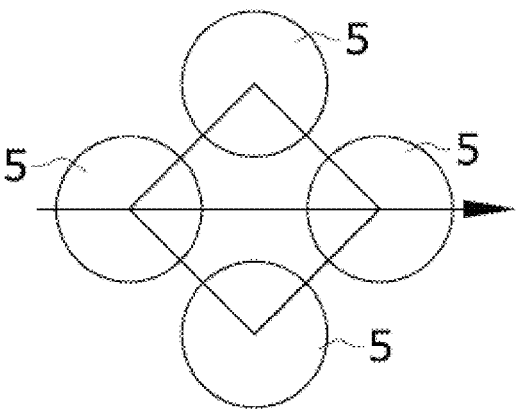

FIGS. 13a-d show four schematic views of particular embodiments of projections patterns that forms the arrangement of the projections (5) according to an airflow direction that is estimated to be generated on the present disc. Particularly, FIG. 13a shows three projections (5) arranged forming a triangular pattern wherein one side of the triangle is perpendicular to the airflow direction at the position of the triangle, that is, two sides of the pattern triangle form an angle of 30° with respect to the airflow direction. FIG. 13b shows three projections (5) arranged forming a triangular pattern wherein one side of the triangle is parallel to the airflow directions at the position of the triangle, that is, two sides of the pattern triangle form an angle of 60° with respect to the airflow direction. FIG. 13c shows four projections (5) arranged forming a square pattern wherein two sides of the square are perpendicular to the airflow direction at the position of the square whilst the other two square sides are parallel to the airflow direction. FIG. 13d shows four projections (5) arranged forming a square pattern wherein the diagonal of the square is parallel to the airflow direction at the position of the square, that is, the four sides of the square form an angle of 45° with respect to the airflow direction. In a particular example, this airflow direction corresponds to a theoretical stream line direction (11) (shown in FIGS. 14 and 15).

FIG. 14 shows a portion of a rotatable forged disc (1) comprising a front surface (2), rim surfaces (4) and a disc bore (8). Particularly, this figure further shows a plurality of curves (11) that describe a theoretical stream line direction that the airflow will follow considering the air system balance and resulting flow velocities (radial, tangential and resulting velocities) of the considered turbine stage. FIGS. 15a-d show four schematic views of particular embodiments of projections patterns that are formed by a plurality of projections arranged on the disc (1) of FIG. 14. These patterns are formed by the distribution of a group of projections on the disc surface according to the theoretical stream line direction (11). The projections pattern shown in these FIGS. 15a-d corresponds to the patterns shown in FIGS. 13a-d but is adapted according to the theoretical stream line direction (11) considering the predicted radial, tangential and resulting velocities at the inner and outer diameters of the disc.

Particularly, the stream line direction (11) is defined at the disc inner diameter, by an inlet angle (a) between a tangent to the stream line direction (11) and the disc tangential direction; at the disc outer diameter, by an outlet angle ((3) between a tangent to the stream line direction (11) and the disc tangential direction; and the joining curve that joints and interpolates the section of the stream line direction at the disc inner diameter and the section of the stream line direction at the disc outer diameter.

Figure 16A:
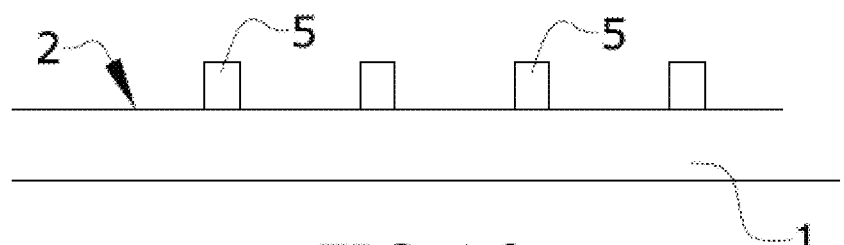
FIGS. 16*a-c* These figures show a schematic cross sectional view of a rotatable forged disc according to embodiments of the present invention.
Figure 16B:
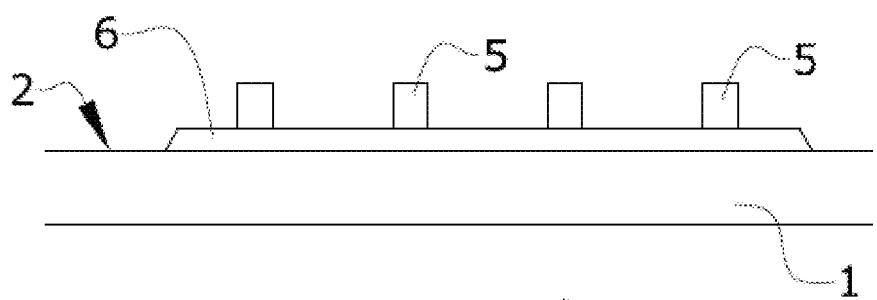
Figure 16C:
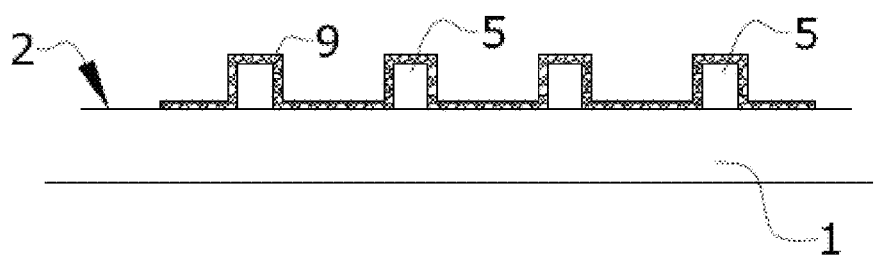

FIGS. 16a-16c show three cross sectional views of particular embodiments of a rotatable forged disc (1) with a plurality of projections (5) located on a front surface (2) of this forged disc (1). Particularly, FIG. 16a shows a plurality of projections (5) printed directly on the front surface (2) of a rotatable forged disc (1). FIG. 16b shows a plurality of projections (5) printed on the front surface (2) of a rotatable forged disc (1) by means of an intermediate support surface (6) that is common to all the projections (5). FIG. 16c shows a plurality of projections (5) printed directly on the front surface (2) of a rotatable forged disc (1) and comprising a coating (9) which covers the front surface (2) and the surfaces of the projections (5).

Figure 7:
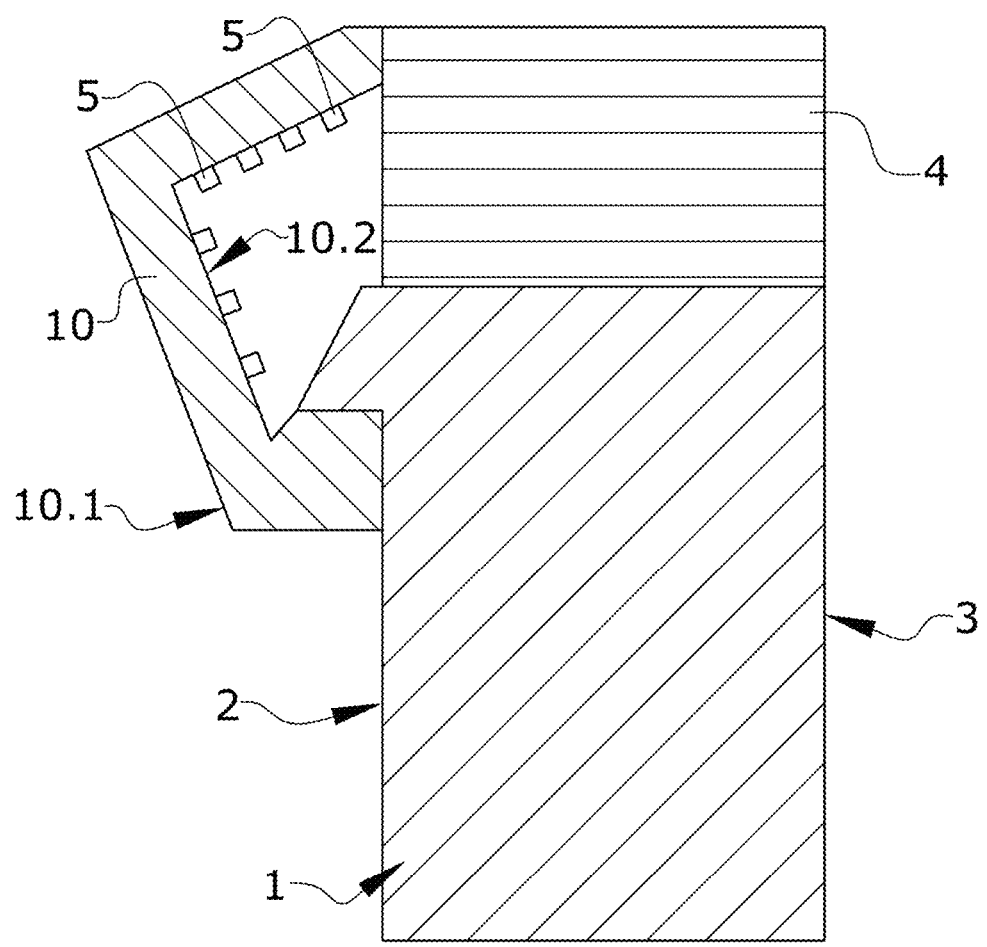
FIG. 7 This figure shows a cross sectional view of a rotatable forged disc with a cover plate according to a particular embodiment of the present invention.

In a particular example, the rotatable forged disc (1) further comprises at least one forged cover plate with an inside and outside face, and a plurality of projections (5) located on at least one of the inside or outside face of the cover plate. This example is shown on FIG. 7, wherein a plurality of projections (5) are printed on the inside surface (10.2) of a forged cover plate (10) provided on the rotatable forged disc (1).

The present invention also provides a method for manufacturing a rotatable forged disc (1), as the ones shown on FIGS. 1, 3-6, for a bladed rotor wheel.

This method comprises the following steps:
a) providing a rotatable forged disc (1) that comprises a front surface (2), a back surface (3) and a rim surface (4), and
b) 3D printing projections (5) on at least a portion of at least one of the front (2) and/or back (3) surface, and optionally on at least a portion of the rim surface (4).

What is claimed is:

1. A bladed rotor wheel for a gas turbine engine comprising at least a rotatable forged disc, the rotatable forged disc comprising:
   a front surface and a back surface,
   at least one rim surface, and
   a plurality of projections located on at least a portion of at least one of the front or back surface,
wherein:
   the forged disc is made from a nickel based alloy forging,
   the projections are discrete 3D printed features protruding outwards from the front surface and/or back surface, so that a discontinuity at an interface between the forged disc surface and the printed projections is provided,
   the projections are arranged forming a continuous bidirectional pattern so that a bulk heat transfer capability is created at the front and/or back surface, and
   the ratio of the distance between projections to the forged disc external radius is lower than 0.15, and
wherein the projections are arranged forming:
   a triangular pattern every three projections, or
   a square pattern every four projections.

2. The bladed rotor wheel according to claim 1, wherein the rotatable forged disc further comprises: at least a forged cover plate with an inside and outside face, and a second plurality of projections located on at least one of the inside or outside face of the cover plate.

3. The bladed rotor wheel according to claim 1, wherein the projections comprise at least one of:
   a cylinder shape,
   a prism shape,
   a droplet shape,
   walls, or
   3D cells.

4. The bladed rotor wheel according to claim 1, wherein the size of the projections varies between them and/or density of the projections pattern varies.

5. The bladed rotor wheel according to claim 4, wherein the size of the projections and/or density of the projections pattern increases in a radial direction of the rotatable forged disc.

6. The blade rotor wheel according to claim 1, wherein the projections are arranged according to a portion of curve matching a theoretical stream line direction defined by predicted radial, tangential and resulting airflow velocities at the inner and outer diameters of the rotatable forged disc during operation; wherein according to this theoretical stream line direction:

for each triangle of the triangular pattern, one side of the triangle is perpendicular to the theoretical stream line direction at the position of the triangle, for each triangle of the triangular pattern, one side of the triangle is parallel to the theoretical stream line direction at the position of the triangle, for each square of the square pattern, two sides of the square are perpendicular to the theoretical stream line direction at the position of the square, or for each square of the square pattern, a diagonal of the square is parallel to the theoretical stream line direction at the position of the square, wherein the theoretical stream line direction is defined:

at the disc inner diameter, by an inlet angle ($\alpha$) measured from the disc tangential direction relative to the disc inner diameter, wherein $\alpha \neq 90°$, at the disc outer diameter, by an outlet angle ($\beta$) measured from the disc tangential direction relative to the disc outer diameter, wherein $\beta \neq 90°$, and a joining curve whose points have an angular position increasing with radial position due to the non-zero components of the airflow radial and tangential velocities.

7. The bladed rotor wheel according to claim 1, wherein the projections are made of a material having a strength and/or corrosion resistance and/or oxidation resistance different to the strength and/or corrosion resistance and/or oxidation resistance of the material of the rotatable forged disc.

8. The bladed rotor wheel according to claim 1, wherein the projections are printed to the rotatable forged disc on an intermediate support surface.

9. The bladed rotor wheel according to claim 8, wherein the intermediate support surface protrudes from the front surface and/or the back surface.

10. The bladed rotor wheel according to claim 9, wherein the protruding intermediate support surface is printed onto the disc and is made of a material having a coefficient of thermal expansion different than the coefficient of thermal expansion of the disc.

11. The bladed rotor wheel according to claim 8, wherein the intermediate support surface is at least a recess on the rotatable forged disc or on a printed support.

12. The bladed rotor wheel according to claim 8, wherein at least a portion of the intermediate support surface forms an angle of 45° with respect to a surface of the rotatable forged disc.

13. The bladed rotor wheel according to claim 1, further comprising a high temperature resistant coating applied on the rotatable forged disc so that this coating covers at least part of any of the disc surfaces and the projections and/or an intermediate support surface.

14. The bladed rotor wheel according to claim 1, wherein at least a portion of the rotatable forged disc where at least one projection is located has a roughness and/or flatness tolerance and/or hardness different from the rest of the rotatable forged disc.

15. A gas turbine engine comprising a bladed rotor wheel according to claim 1.

16. A method for manufacturing the rotatable forged disc for the bladed rotor wheel according to claim 1, the method comprising the following steps:

providing the rotatable forged disc that comprises the front surface, the back surface, and the rim surface, and 3D printing the projections on at least the portion of at least one of the front or back surface.

17. The bladed rotor wheel according to claim 1, wherein a third plurality of projections is located on at least a portion of the rim surface.

18. The bladed rotor wheel according to claim 17, wherein the third plurality of projections protrudes outwards from the rim surface.

19. The bladed rotor wheel according to claim 18, wherein the third plurality of projections are printed to the rotatable forged disc on a second intermediate support surface, wherein the second intermediate support surface protrudes from the rim surface of the rotatable forged disc.

\* \* \* \* \*